United States Patent [19]
Aoyama

[11] Patent Number: 5,150,677
[45] Date of Patent: Sep. 29, 1992

[54] DIRECT INJECTION DIESEL ENGINE

[75] Inventor: Shunichi Aoyama, Yokohama, Japan

[73] Assignee: Nissan Motor Co., Ltd., Kanagawa, Japan

[21] Appl. No.: 746,012

[22] Filed: Aug. 14, 1991

[30] Foreign Application Priority Data

Aug. 16, 1990 [JP] Japan .................... 2-216166

[51] Int. Cl.⁵ .................... F02M 35/10; F02D 9/10
[52] U.S. Cl. .................... 123/302; 123/308; 123/432
[58] Field of Search .......... 123/302, 315, 308, 432

[56] References Cited

U.S. PATENT DOCUMENTS

| | | | |
|---|---|---|---|
| 3,395,690 | 8/1968 | Riley | 123/302 |
| 3,832,983 | 9/1974 | Nickly | 123/302 |
| 4,240,381 | 12/1980 | Lowther | 123/302 |
| 4,688,532 | 8/1987 | Hasegawa | 123/302 |
| 4,702,203 | 10/1987 | Ohmi | 123/302 |
| 4,902,210 | 3/1990 | Shimada et al. | 123/308 |
| 4,944,266 | 7/1990 | Hasegawa | 123/308 |
| 4,972,814 | 11/1990 | Natsuki | 123/308 |

FOREIGN PATENT DOCUMENTS 61-218769 9/1986 Japan .

Primary Examiner—E. Rollins Cross
Assistant Examiner—Erick Solis
Attorney, Agent, or Firm—Lowe, Price, LeBlanc & Becker

[57] ABSTRACT

In a direct injection diesel engine provided with a fuel injector facing the center of the combustion chamber, a fuel injection pump supplying high pressure fuel to said injector, two air intake ports and two exhaust ports disposed in apposition to one another around said injector as center, air intake valves and exhaust valves which open and close these ports in synchronization with the engine, a swirl control valve installed in one air intake port, and a control means which adjusts the aperture of said control valve depending on the fuel injection pressure, the swirl control valve shuts when the fuel injection pressure is low so as to enhance the swirl of intake air. This promotes conversion of fuel to fine droplets, uses air more efficiently in the combustion and thereby reduces smoke generation. On the other hand, when the injection pressure is high, the swirl control valve opens which increases the charging efficiency and makes it possible to withdraw high power from the engine.

11 Claims, 6 Drawing Sheets

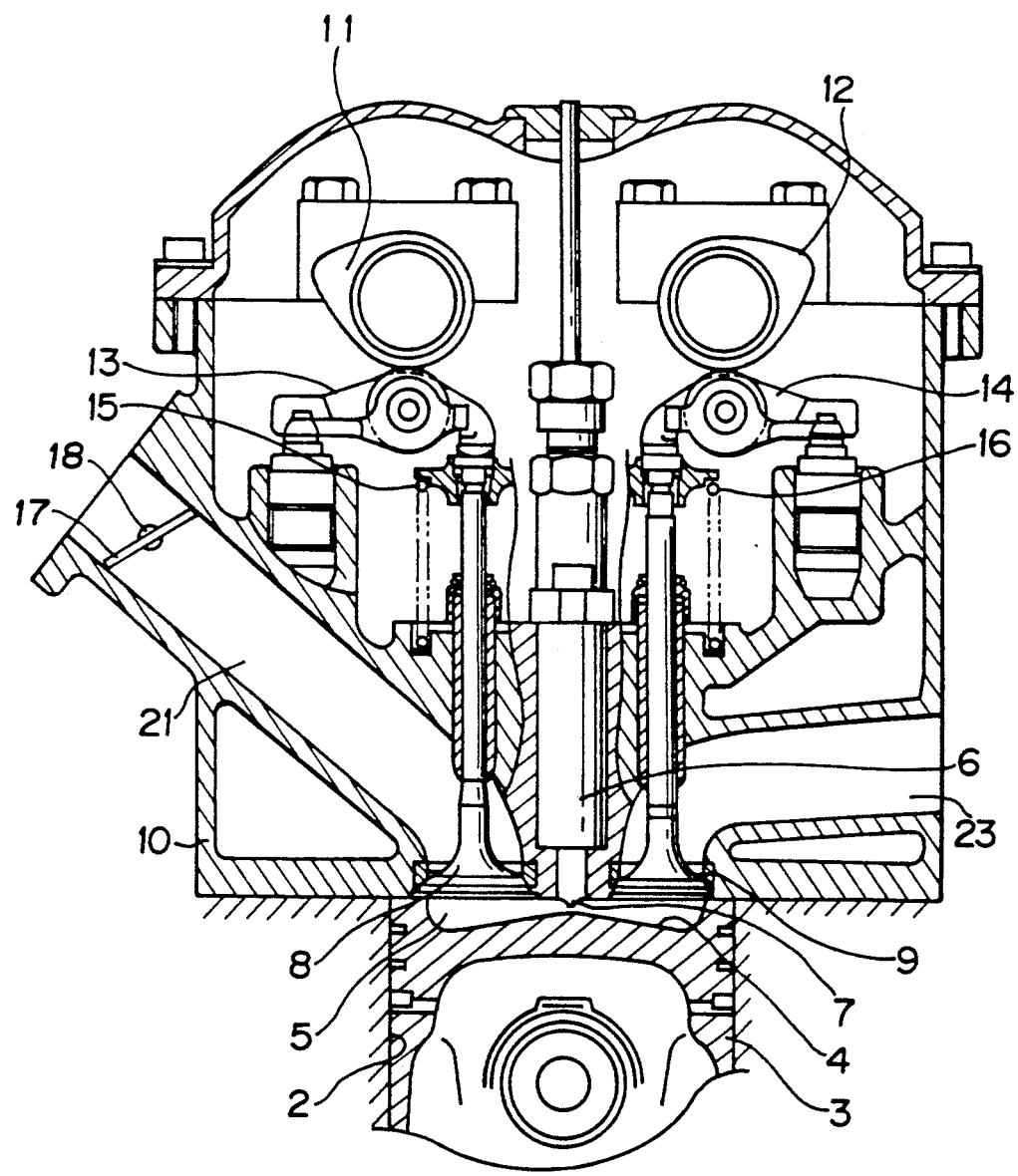
F I G. 1

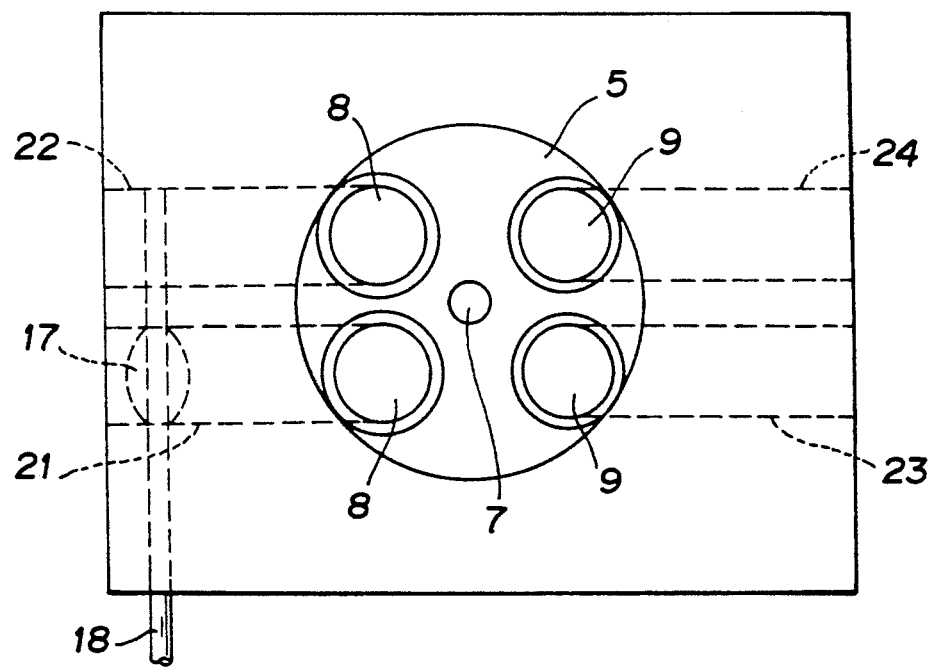
F I G. 2

DIRECT INJECTION DIESEL ENGINE

FIELD OF THE INVENTION

The present invention relates generally to a direct injection diesel engine and, more particularly, to reducing smoke in a direct injection diesel engine.

BACKGROUND OF THE INVENTION

In recent years, there is an increasing demand for low pollution, high power diesel engines. In this context, Jikkaisho 61-218769 published by the Japanese Patent Office, for example, discloses an engine in which combustion is improved by varying fuel injection characteristics based on engine speed or load, and raising fuel injection pressure to exceed 100 bars to convert fuel to fine droplets.

In such engines, however, a high pressure injection pump compresses the fuel through engine driven cams. Even if the injection pressure is sufficient at high engine speeds, therefore, the pressure at low engine speeds is only half of this value or less. Consequently, at low engine speed, conversion of fuel to fine droplets is poor, fuel does not mix properly with air, air is not used efficiently in the combustion process and more smoke is generated.

Better mixing of fuel and air can be promoted by setting up an air intake swirl in the combustion chamber. In direct injection diesel engines, however, the amount of smoke in the exhaust increases if the swirl ratio (intake air swirl speed/engine speed) is higher or lower than the optimum swirl ratio. Furthermore, the optimum swirl ratio varies with the injection pressure and is not constant.

It is therefore difficult to reduce the amount of smoke in direct injection diesel engines.

SUMMARY OF THE INVENTION

An object of this invention is to reduce smoke generation in direct injection diesel engines.

Another object of this invention is to achieve high power in direct injection diesel engines.

To achieve these objects, this invention provides a direct injection diesel engine wherein fuel is injected directly into a combustion chamber formed by a cylinder and a piston. The engine comprises a fuel injector facing the center of the combustion chamber, and a direct injection pump which supplies high pressure fuel to the injector in synchronization with the engine speed. Two air intake ports and two exhaust ports are disposed in opposition to each other around the center of the injector, and air intake valves and exhaust valves are provided which open and close these air intake ports and exhaust ports, respectively, in synchronization with the engine speed. A swirl control valve controls the aperture of one air intake port, and a control unit adjusts the aperture of the swirl control valve depending on the fuel injection pressure.

BRIEF DESCRIPTION OF THE DRAWINGS

FIG. 1 is a vertical section of the cylinder head and upper part of a cylinder in a direct injection diesel engine according to this invention;

FIG. 2 is a plan view of the cylinder head viewed from the combustion chamber in FIG. 1;

DESCRIPTION OF THE PREFERRED EMBODIMENTS

Figure 3:
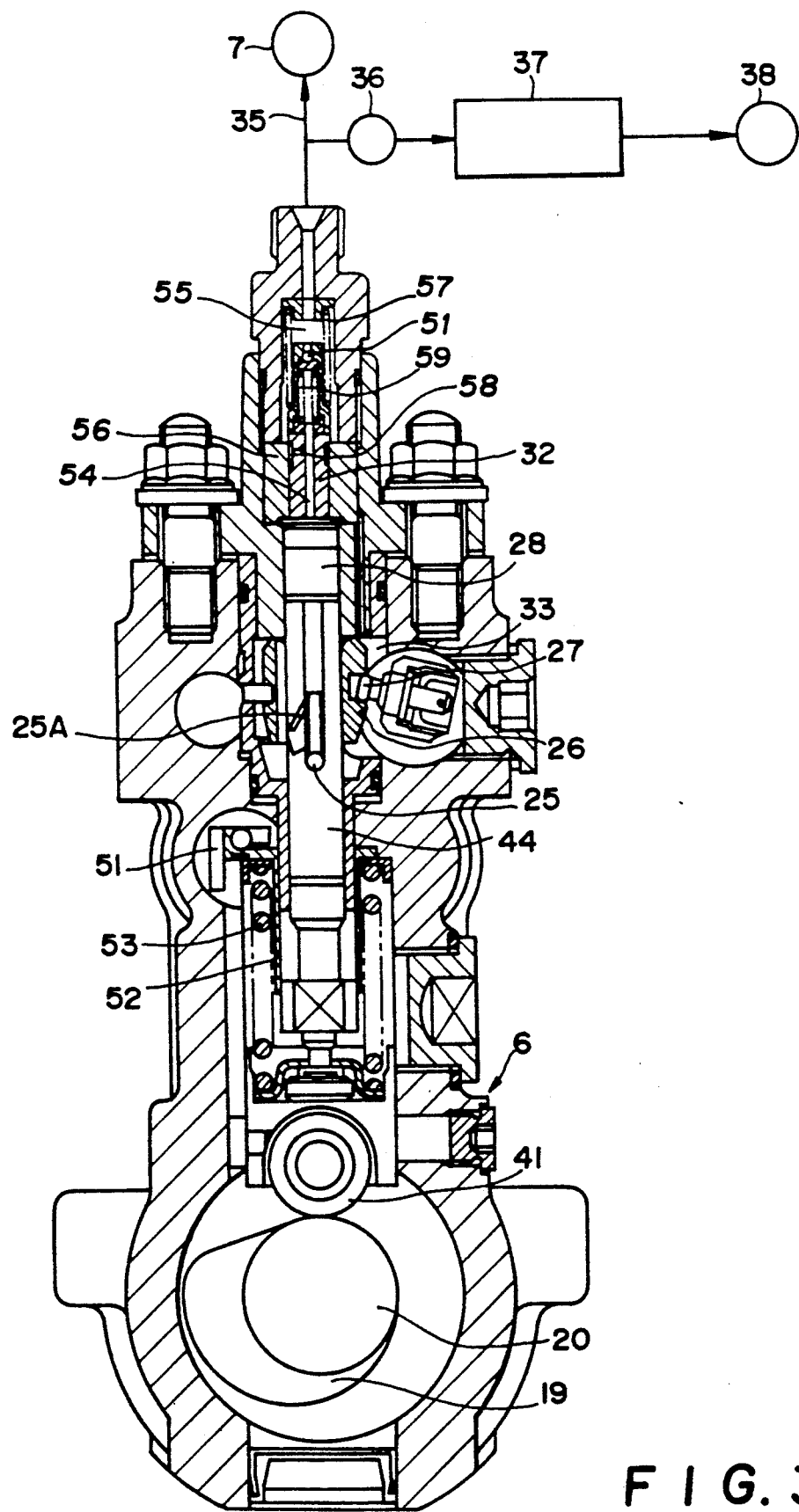
FIG. 3 is a vertical section of the fuel injection pump used in the direct injection diesel engine according to this invention.

Referring to FIGS. 1 and 2, a combustion chamber 5 is formed by a cylinder 2, cylinder head 10 and piston 3. A cavity 4, being a part of the combustion chamber 5, is formed at the top of piston 3.

A fuel injector 7 is fitted to the cylinder head 10 on the central axis of cylinder 2 and facing the combustion chamber 5.

Two air intake ports 21, 22, and two exhaust ports 23, 24, are disposed parallel to and in opposition to each other in the cylinder head 10.

Air intake valves 8 and exhaust valves 9 which respectively open and close the air intake ports 21, 22 and exhaust ports 23, 24, are disposed symmetrically around the fuel injector 7. The valves 8 and 9 are installed such that the valve stem is parallel to the central axis of cylinder 2.

The fuel injector 7 thus disposed at the center of the combustion chamber 5, injects fuel uniformly therein.

The intake valves 8 and exhaust valves 9 are subjected to the forces of springs 15 and 16 which respectively act to close the valves. Cams 11, 12 and rocker arms 13, 14 are provided in the cylinder head 10. The cams 11 and 12 are rotated by the engine, press the intake valves 8 and exhaust valves 9 down in opposition to the springs 15 and 16 via the rocker arms 13 and 14 which are supported such that they are free to oscillate in the cylinder head 10, and thereby open and close the valves with a specified phase difference in synchronization with the engine.

A disc-shaped swirl control valve 17 is provided in the air intake port 21. This swirl control valve 17 is attached to a rotating shaft 18, and is rotated by an actuator 38 (shown in FIG. 3) connected to one end of the shaft 18.

The fuel injector 7 is connected to a fuel injection pump 6 via a pipe 35 as shown in FIG. 3, and injects high pressure fuel supplied from the pump 6 into the combustion chamber 5.

The fuel injection pump 6 is of such a construction that a plunger 44 is lifted via a cam 19 and a roller 41 when the cam axis 20 connected directly to the crank shaft of the engine rotates. A return spring 53 is provided to pull the plunger back to its original position.

The plunger 44 is provided with a fuel injection passage 25. One end of this passage 25 opens on to a fuel supply chamber 33 which surrounds the plunger 44, and the other end is connected to a high pressure chamber 28 above the plunger 44.

A control sleeve 26 grips the outer surface of the plunger 44 such that the plunger 44 is free to slide. As the plunger 44 rises, this control sleeve 26 obstructs the connection to the fuel supply chamber 33 by closing the fuel supply passage 25 which opens onto the side of the plunger 44. The plunger 44 therefore begins to pressurize fuel in the high pressure chamber 28.

The control sleeve 26 is provided with a spill port (not shown) which is connected to the fuel supply chamber 33. When a groove 25A which connects with the fuel supply passage 25 of the rising plunger 44 reaches this spill port, the pressure in the high pressure chamber 28 is released to the fuel supply chamber 33, and fuel pressurization is complete.

The groove 25A is formed at an inclination to the outer circumference of the plunger 44. By rotating plunger 44 on the inner circumference of the control sleeve 26, the plunger strokes up to the time when the spill port is connected, and thus the amount of fuel injected, can be varied.

The plunger 44 rotates when a sleeve 52 is rotated by a rack 51 which moves parallel to the cam shaft 20. The position of the rack 51 is controlled by a drive mechanism (not shown) depending on the degree of depression of an accelerator pedal.

The position of the control sleeve 26 with respect to the axis of the plunger 44 is controlled by a sleeve drive cam 27. When the control sleeve 26 moves upwards fuel feed is delayed, pressurization of fuel occurs while the plunger 44 is being lifted rapidly by the cam 19, and the injection pressure is higher. On the other hand, when the control sleeve 26 moves downwards fuel feed occurs earlier, pressurization occurs while the plunger 44 is still being lifted slowly by the cam 19, and the injection pressure is consequently lower.

On partial load, therefore, fuel feed is delayed and the fuel supplied for each lift of the plunger (fuel supply rate) is increased, while on full load, fuel feed occurs earlier and the fuel supply rate is reduced. This has the effect of maintaining the injection pressure on partial load, and preventing excessive rise of injection pressure on full load.

A delivery valve 32 is provided adjacent the high pressure chamber 28. This delivery valve 32 has a passage 54 permanently connected to the high pressure chamber 28, and a transverse passage 58 connected to the passage 54 and open to the outside of the delivery valve 32. When the pressure in the high pressure chamber 28 is low, the delivery valve 32 is pushed down by a spring 57, the transverse passage 58 is closed by a sleeve 56 which slides on the outer circumference of the delivery valve 32, and the connection to a fuel outlet chamber 55 situated above the high pressure chamber 28 is shut off.

When the pressure in the chamber 28 increases, the delivery valve 32 moves upwards against the force of the spring 57, the passage 58 is exposed to the fuel outlet chamber 55 above sleeve 56, and the high pressure chamber 28 is thereby connected to he fuel outlet chamber 55 via the passage 54.

A pressure equalizing valve 51 is also inserted between the chamber 55 and passage 54 such that it functions in parallel with the delivery valve 32. This valve 51 is fitted on the upper part of the delivery valve 32, and is supported by a pressure setting spring 59.

After injection of fuel, when the residual pressure in the pipe 35 rises above the set pressure of the pressure setting spring 59, the pressure equalizing valve 51 opens, part of the fuel flows back from the fuel outlet chamber 55 to the fuel supply chamber 33 via the passage 54, the residual pressure in the pipe 35 is maintained constant, and secondary injection of fuel through the fuel injector 7 is prevented.

Due to the action of this pressure equalizing valve 51, the pressure of the fuel injection pump 6 can be increased depending on the position setting of the control sleeve 26 without any risk of secondary injection taking place. The injection pressure of the fuel injector 7 can thus be increased, and fuel can be converted to fine droplets more efficiently.

A pressure sensor 36 is interposed in the pipe 35. An electronic control unit 37 controls the rotational setting of the swirl control valve 17 depending on the injection pressure detected by this sensor 36.

Figure 4:
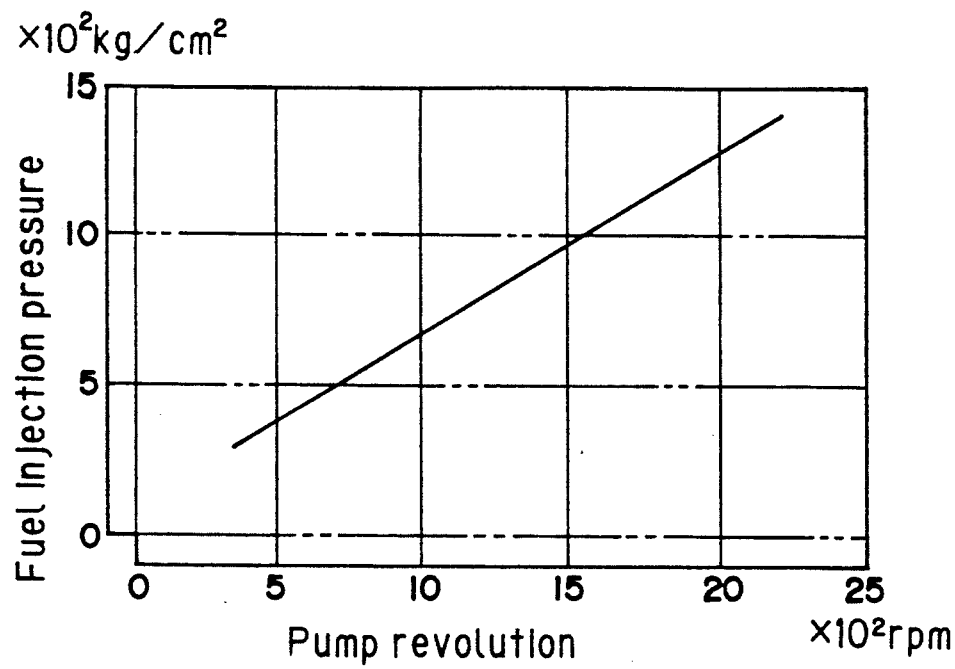
FIG. 4 is a graph showing the relation between pump revolution and fuel injection pressure in the direct injection engine according to this invention.

Since this fuel injection pressure is increased in proportion to the rotation speed of the cam axis 20 as shown in FIG. 4, such construction is also possible that the electronic control unit 37 calculates the fuel injection pressure from the rotation speed of the fuel injection pump or that of the engine and then controls the aperture of the swirl control valve 17 depending on the calculated value.

Figure 5:
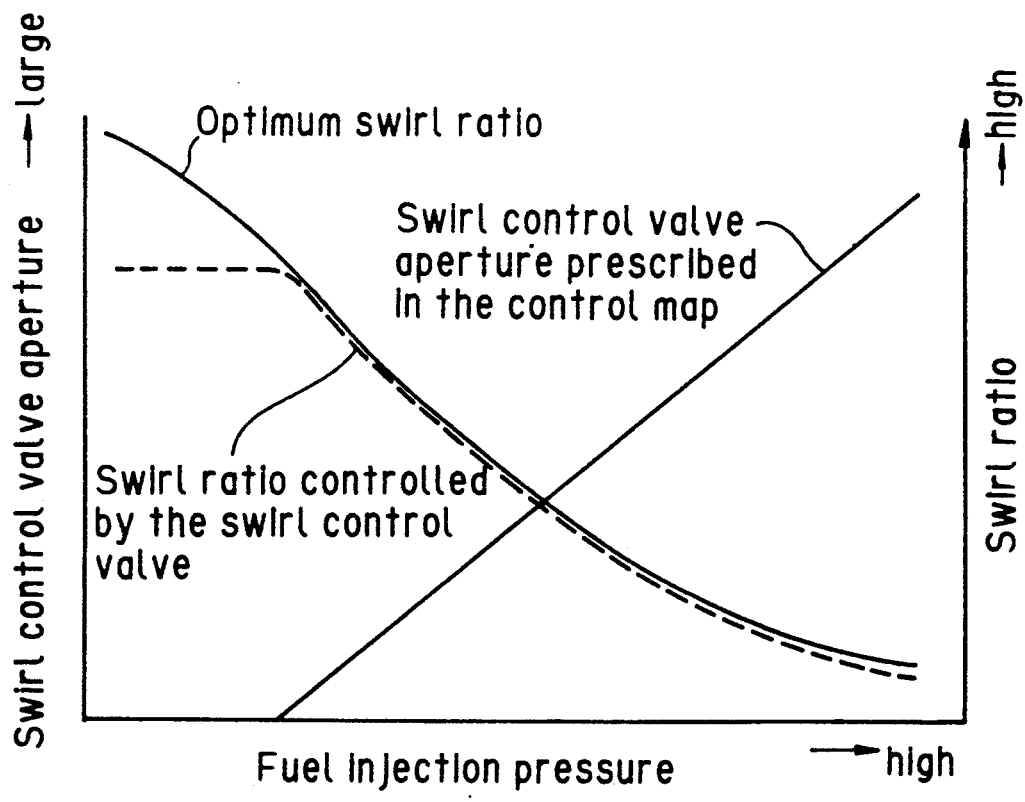
FIG. 5 is a graph showing the relations between fuel injection pressure, optimum swirl ratio and swirl control valve aperture in the direct injection diesel engine according to this invention.

A control map according to which the aperture of the swirl control valve 17 increases linearly with the injection pressure as shown by the graph of FIG. 5, is stored in the memory of the electronic control unit 37. When there is a signal input corresponding to the injection pressure delivered by the fuel injector 7 from the pressure sensor 36, the aperture of the swirl control valve 17 is adjusted via the actuator 38 based on this map. As a result, the swirl ratio obtained is very close to the optimum value of swirl ratio over almost the entire range of injection pressure as shown by the dotted line of FIG. 5.

Figure 7:
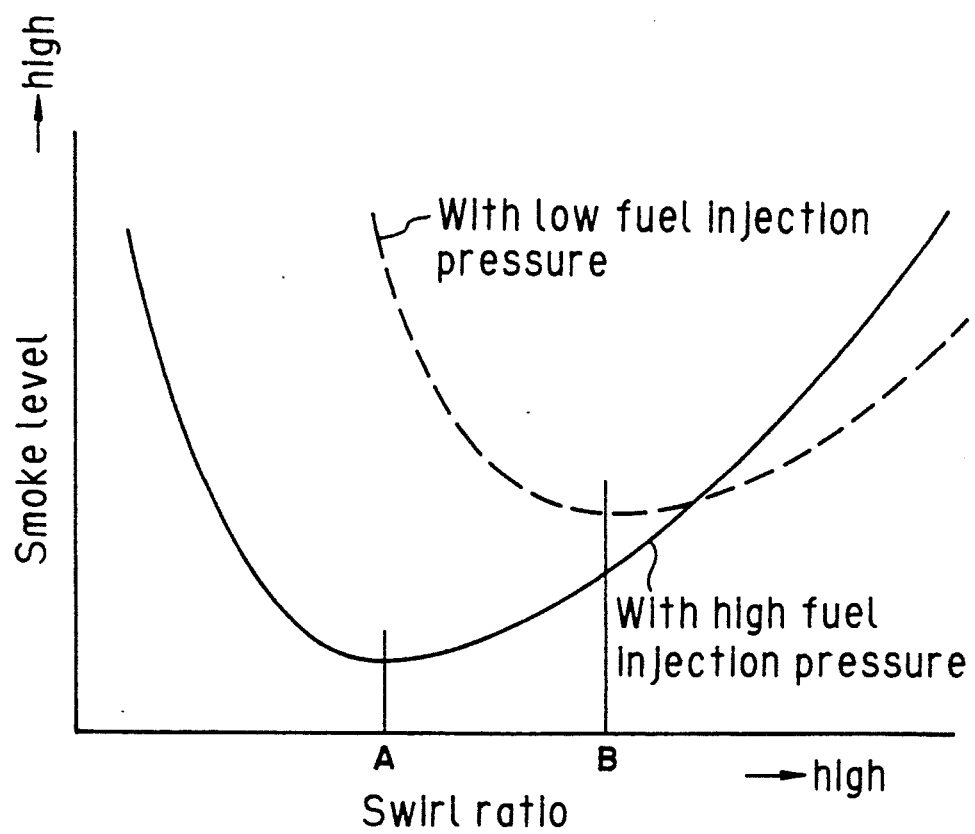
FIG. 7 is a graph showing the relation between swirl ratio and smoke level in the direct injection diesel engine according to this invention.

Due to this control, the swirl control valve 17 closes the air intake port 21 when the engine is running at low or medium speed and the fuel injection pressure is low, and an air swirl is set up in the combustion chamber 5 by air led in from the air intake port 22. FIG. 7 shows the relation between swirl ratio and smoke generation when the fuel injection pressure is high, and when it is low. At low injection pressures, the swirl ratio is adjusted to an optimum value corresponding to point 8 in FIG. 7, and conversion of fuel injected from the fuel injector 7 to fine droplets is promoted by the mixing action of the air swirl. This avoids ignition delay and increases the combustion speed, so smoke generation is maintained at a low level.

Figure 6:
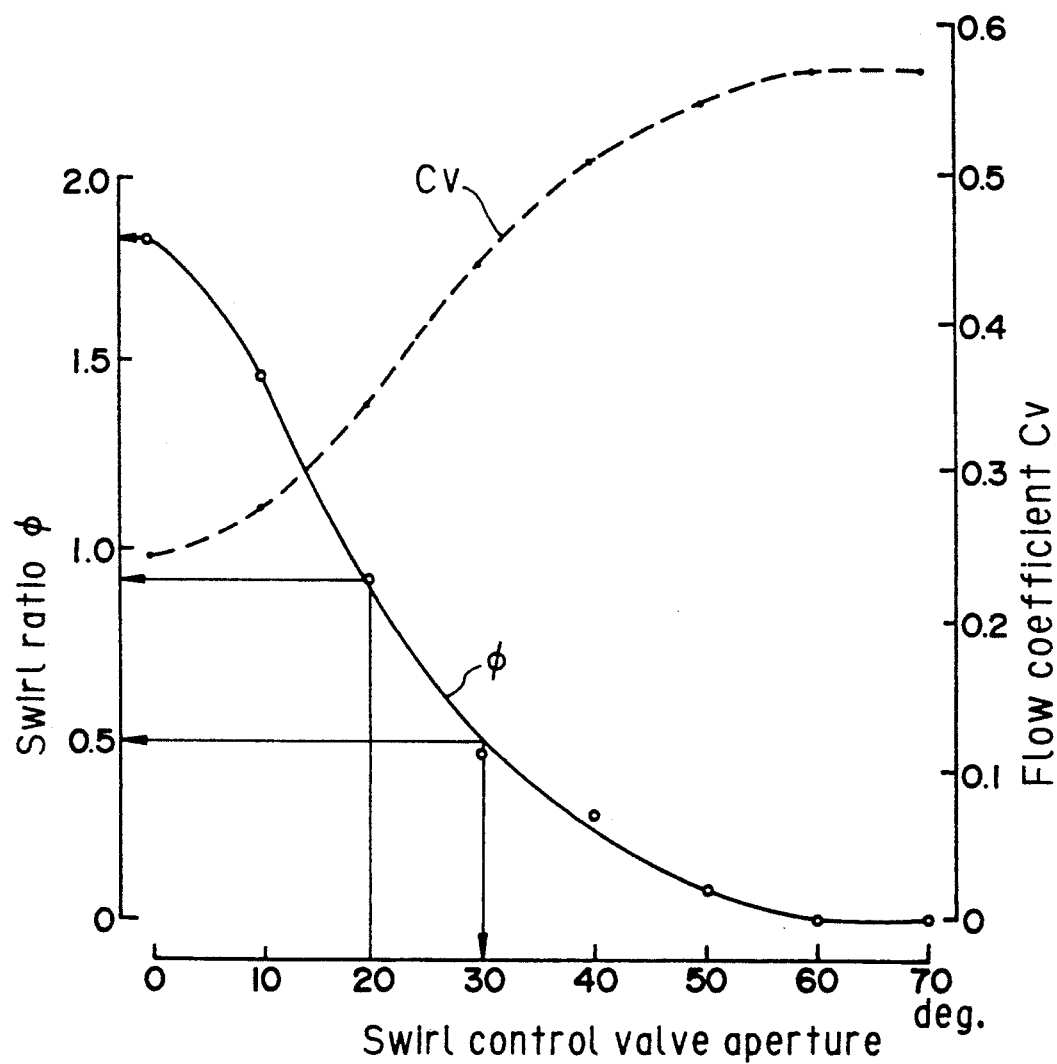
FIG. 6 is a graph showing the relations between swirl control valve aperture, swirl ratio and flow coefficient in the direct injection diesel engine according to this invention.

The flow coefficient Cv of air entering the combustion chamber 5 is smaller for smaller apertures of the swirl control valve 17, as shown in FIG. 6. However, as the amount of air required by the engine when running at low or medium speed is small, the charging efficiency of air in the chamber 5 is still sufficient even when air is supplied from only one air intake port 22 due to closure of the swirl control valve 17.

When the engine is running at high speed and fuel injection pressure is high, the swirl control valve 17 opens, the air led into the combustion chamber 5 from the air intake ports 21 collides with the air from the air intake port 22, and the swirl effect is attenuated. In this case, conversion of fuel to fine droplets is promoted by the high injection pressure so that the fuel again disperses and mixes well with air in the chamber 5. The swirl ratio then has a small value corresponding to the point A in FIG. 7. At the same time, the flow coefficient Cv increases due to the opening of the swirl control valve 17, a high air charging efficiency is obtained, and high power can be obtained from the engine.

The foregoing description of a preferred embodiment for the purpose of illustrating this invention is not to be considered as limiting or restricting the invention, since many modifications may be made by those skilled in the art without departing from the scope of the invention.

The embodiments of the invention in which an exclusive property or privilege is claimed are defined as follows:

1. A direct injection diesel engine wherein fuel is injected directly into a combustion chamber formed by a cylinder, a cylinder head, and a piston, comprising:
   a fuel injector fitted to the cylinder head and facing the center of said combustion chamber,
   a fuel injection pump which supplies high pressure fuel to said fuel injector in synchronization with the engine,
   two air intake ports and two exhaust ports disposed in opposition to each other around said fuel injector,
   air intake valves and exhaust valves which respectively open and close said air intake ports and exhaust ports in synchronization with the engine,
   a swirl control valve provided in one of said air intake ports,
   an electronic control unit to adjust the aperture of said swirl control valve,
   means for detecting injection pressure of said fuel injector,
   a control map provided in said control unit specifying the relation between said injection pressure and the aperture of said swirl control valve for causing said control unit to open said swirl control valve wider when said injection pressure increases.

2. A direct injection diesel engine as defined in claim 1, wherein said control map specifies the aperture of said swirl control valve to vary in linear proportion to said injection pressure.

3. A direct injection diesel engine as defined in claim 1, wherein the central axis of said fuel injector coincides with the central axis of said cylinder.

4. A direct injection diesel engine as defined in claim 3, wherein the central axes of said air intake valves and said exhaust valves are parallel to the central axis of said cylinder.

5. A direct injection diesel engine as defined in claim 3, wherein said two air intake ports are disposed parallel to one another on either side of said fuel injector.

6. A direct injection diesel engine as defined in claim 3, wherein said two exhaust ports are disposed parallel to one another on either side of said fuel injector.

7. A direct injection diesel engine as defined in claim 1, wherein said fuel injection pump has a control sleeve which advances or delays the timing at which fuel feed occurs.

8. A direct injection diesel engine as defined in claim 7, wherein said control sleeve advances the timing of fuel feed and decreases the fuel injection rate when the engine is running on full load.

9. A direct injection diesel engine as defined in claim 7, wherein said fuel injection pump comprises a delivery valve which prevents fuel flowing back from the pipe connecting said fuel injection pump and fuel injector and a pressure equalizing valve which is arranged in parallel with said delivery valve and maintains the residual pressure in said pipe approximately constant.

10. A direct injection diesel engine wherein fuel is injected directly into a combustion chamber formed by a cylinder, a cylinder head, and a piston, comprising:
    a fuel injector fitted to the cylinder head and facing the center of said combustion chamber,
    a fuel injection pump which supplies high pressure fuel to said fuel injector in synchronization with the engine,
    two air intake ports and two exhaust ports disposed in opposition to each other around said fuel injector,
    air intake valves and exhaust valves which respectively open and close said air intake ports and exhaust ports in synchronization with the engine,
    a swirl control valve provided in one of said air intake ports, and
    a control means to adjust the aperture of the swirl control valve as a function of the injection pressure of said fuel injector,
    wherein said control means is an electronic control unit provided with a control map specifying the relation between the injection pressure and the aperture of said swirl control valve.

11. A direct injection diesel engine wherein fuel is injected directly into a combustion chamber formed by a cylinder, a cylinder head, and a piston, comprising:
    a fuel injector fitted to the cylinder head and facing the center of said combustion chamber,
    a fuel injection pump which supplies high pressure fuel to said fuel injector in synchronization with the engine,
    two air intake ports and two exhaust ports disposed in opposition to each other around said fuel injector,
    air intake valves and exhaust valves which respectively open and close said air intake ports and exhaust ports in synchronization with the engine,
    a swirl control valve provided in one of said air intake ports, and
    a control means to adjust the aperture of the swirl control valve as a function of the injection pressure of said fuel injector,
    wherein said control means is an electronic control unit provided with a control map specifying the relation between the injection pressure and the aperture of said swirl control valve and wherein said control map causes the aperture of said swirl control valve to vary in linear proportion to said injection pressure.

* * * * *